United States Patent
Viaud

(10) Patent No.: US 7,210,281 B2
(45) Date of Patent: May 1, 2007

(54) ASSEMBLY FOR SECURING A LOOSE YARN END ON A CYLINDRICAL BALE

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 11/170,028

(22) Filed: Jun. 29, 2005

(65) Prior Publication Data

US 2006/0045656 A1    Mar. 2, 2006

(30) Foreign Application Priority Data

Jul. 8, 2004    (DE)    ..................    10 2004 033 088

(51) Int. Cl.
  *B65B 63/04*    (2006.01)
  *A01F 15/08*    (2006.01)
(52) U.S. Cl. .................. 53/587; 100/5; 56/341
(58) Field of Classification Search ............... 100/5, 100/13; 56/341; 53/587, 118, 176
  See application file for complete search history.

(56) References Cited

U.S. PATENT DOCUMENTS 4,281,500 A * 8/1981 Mueller et al. ............... 53/587
5,729,953 A * 3/1998 Fell et al. ..................... 53/118
6,050,052 A * 4/2000 Herron et al. ................ 53/118
6,233,913 B1 * 5/2001 Roth et al. ..................... 56/341
6,453,805 B1 * 9/2002 Viaud et al. .................... 100/5

FOREIGN PATENT DOCUMENTS

| DE | 41 32 664 | 10/1991 |
|----|-----------|---------|
| DE | 199 30 674 | 7/1999 |
| EP | 0 535 532 | 9/1992 |
| EP | 0672340 | 3/1995 |
| EP | 1 064 839 | 6/2000 |
| EP | 1 321 028 | 12/2002 |

* cited by examiner

*Primary Examiner*—Stephen F. Gerrity

(57) ABSTRACT

An assembly for securing a loose yarn end on a cylindrical bale by the use of a band. The band can be conducted to a baling chamber by an advance assembly driven by a motor, where the band can be wrapped around a cylindrical bale in the region of the loose yarn end. The advance assembly is connected to the motor by an overrunning clutch that establishes a drive connection between the motor and the advance assembly only in a first motion transmission direction. The drive connection is established when the motor rotates in a first direction and the advance assembly conveys the band in the direction of the baling chamber.

7 Claims, 4 Drawing Sheets

ASSEMBLY FOR SECURING A LOOSE YARN END ON A CYLINDRICAL BALE

BACKGROUND

1. Field of the Invention

The invention relates generally to an assembly for securing a loose yarn end on a cylindrical bale.

2. Related Technology

Typically, rotobalers include a yarn wrapping assembly and an assembly for securing the end of the yarn lying upon the circumferential surface of the cylindrical bale. The end of the yarn is secured by means of a band that may be configured as an adherent or pressure sensitive tape in itself and is conducted to an inlet slot for the harvested crop by means of two supply pulleys, at least one of which is driven, and a sheet metal guide. There, the band is grasped by the rotating bale and wrapped around it. The band is cut off from the supply pulley by stopping the drive of the supply pulleys, which leads to a tearing of the band. Here it is seen as a disadvantage that the speed of the supply pulleys must be synchronized with the speed of the bale, which may be relatively costly, particularly in the case of bales of variable sizes. The cutting of the band by means of stopping the supply pulleys may be problematical, particularly in the case of bands of elastic material.

In another assembly for securing a loose yarn end on a cylindrical bale, a loose end of the band is pressed against a driven conveying element, in particular a belt, by means of a guide surface moved by a motor, and is carried along by the belt and wrapped around the circumference of the bale. A separate cutting assembly is used to cut the band from its supply pulley and is composed of a molding and pointed pins arranged on the molding. The movable guide surface brings the band into contact with the cutting assembly as soon as the bale has been wrapped sufficiently, so that the section of the band wrapped around the bale is cut from the remaining supply. Here, the advance of the band is performed only by the conveying element. Therefore, there is no possibility of advancing the band any further in the event the conveying element does not accept it, for example, in the case of dirt.

In another baler, a supply assembly for a tape for wrapping a bale, is driven by a free-wheeling assembly. Here, there is no provision for securing the free ends of the yarn.

The problem underlying the invention is seen in the need to define an assembly for securing a loose yarn end on a cylindrical bale that is improved as against the state of the art.

SUMMARY OF THE INVENTION

In the present invention, an overrunning clutch is arranged between the motor and the advance assembly. The overrunning clutch transmits a movement from the motor to the advance assembly only in a certain, first movement transmission direction. The power is then transmitted when the motor rotates in a first direction and the advance assembly conveys the, preferably self adhesive, band. The movement provided by the motor and transmitted by the overrunning clutch may be a linear movement or a rotary movement.

In this way, the motor actively conducts the band to the baling chamber by means of the advance assembly or at least moves it in that direction, so that the band can be grasped by the conveying element of the baling chamber and can be laid around the bale. The overrunning clutch separates the motor from the advance assembly, as soon as the band is grasped by the conveying element or by the cylindrical bale and therefore endeavors to drive the advance assembly more rapidly than it is driven by the motor. The result is an improved supply of the band to the baling chamber.

In one embodiment of the invention, the motor is driven bi-directionally and is connected to a separating assembly by means of a second overrunning clutch. The position of the separating assembly can be adjusted by the motor. A drive connection between the motor and the separating assembly is established by means of the second overrunning clutch only if the motor moves in a second direction that is opposite to the aforementioned first direction.

The result is that the motor can also be used for the movement of the separating assembly. The separating assembly is used to cut the band wrapped around the bale from the remaining supply of the band.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
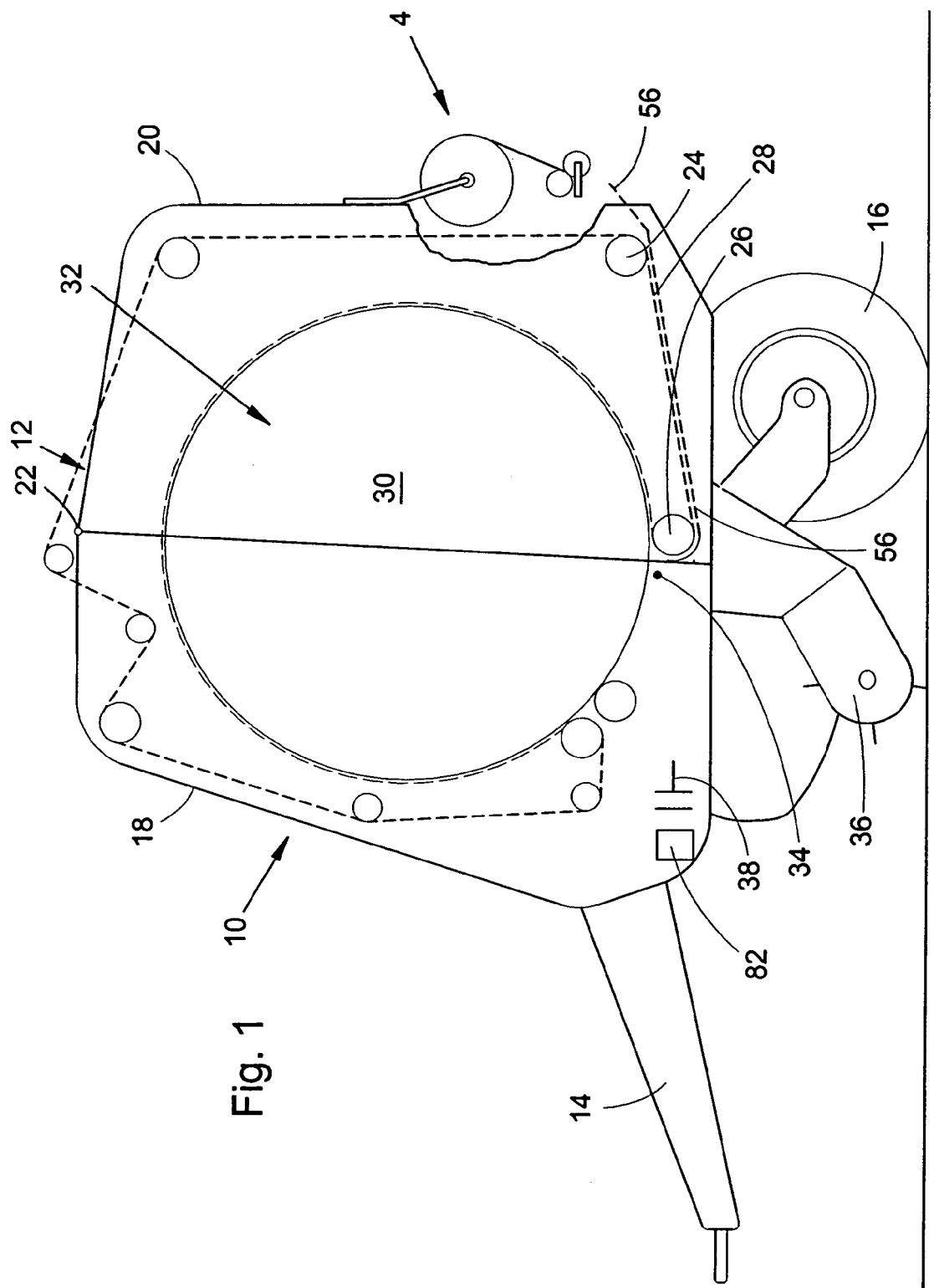
FIG. 1 is a schematic side view of a rotobaler having features of the present invention.

FIG. 1 shows a rotobaler 10 with a housing 12 that can be coupled to an agricultural tractor, not shown, by means of a towbar 14, in order to be drawn across a field, to the left relative to FIG. 1 in a direction of operation, and that is supported on wheels 16. The housing 12 is composed of a front, rigid housing half 18 and a rear, pivoted housing half 20, that are connected to each other, free to pivot, about an upper joint 22. The housing 12 carries a multitude of rolls of which a lower, rear roll 24 and a lower, forward roll 26 of the rear housing half 20 are shown. Several endless conveying elements 28, arranged alongside each other, extend over the rolls 24, 26 and largely enclose a baling chamber 32 together with the side walls 30 of the housing 12. In this embodiment the conveying elements 28 are configured as belts. An inlet 34 is provided in the lower region of the baling chamber 32, it is bordered to the rear by the roll 26 and permits the entry of crop taken up by the pick up 36 into the baling chamber 32.

A yarn wrapping assembly 38 is provided underneath the towbar 14 and in the region of the inlet 34 with which yarn can be wrapped around the rotating cylindrical bale in order to bind the latter. In this embodiment the yarn wrapping assembly 38 is configured in such a way that the last yarn wrappings are deposited on the left side of the cylindrical bale as seen in the forward operating direction. A rotobaler 10 as described so far is already known in the state of the art, and therefore does not require any further description.

Figure 2:
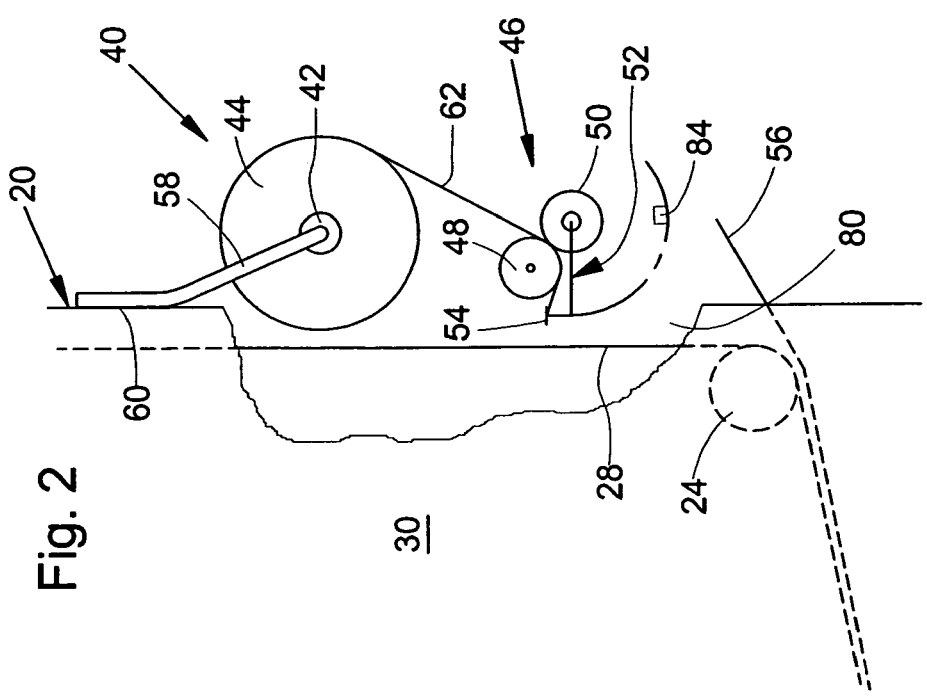
FIG. 2 is an enlarged side view of the rear region of the rotobaler with an assembly for securing a loose yarn end on a cylindrical bale.

FIG. 2 shows the rear housing half 20 as seen from the left. In this view, in particular, the right rear side wall 30, a conveying element 28 and an assembly 40 for the securing of loose yarn ends on the surface of the cylindrical bale can be seen. Among other items, the assembly 40 includes a pulley carrier 42, a pulley shaped band supply 44, an advance assembly 46 with two interacting supply rolls 48, 50, a separating assembly 52, an anvil 54 and a guide assembly 56.

The assembly 40 is shown here in connection with a rotobaler 10 with a baling chamber 32 of variable size that is surrounded by belt-shaped conveying elements 28. In contrast to this assembly the assembly 40 can also be provided on a rotobaler 10 with a baling chamber 32 of invariable size and at another location than the rear wall 60 of the rear housing half 20. By the same token, chains or pulleys could also be used in place of the belts.

The pulley carrier 42 is configured in the form of a rigid axle and is retained on the rear wall 60 by an angle-shaped carrier 58. The pulley carrier 42 is provided so that it can accept a pulley of the pulley-shaped band supply 44, where a brake, not shown, can be provided between the band supply 44 and the pulley carrier 42. The task of the brake is to impede the band supply 44 from a free rotary movement on the pulley carrier 42.

The band supply 44 contains a large amount of thin, elastic, strong and adhering band 62. It is preferably in the form of a net. The adhesiveness can be obtained by an adhesive applied to one or both sides of the band 62, by the characteristic of the net and/or by adhesion. When the band supply 44 is exhausted, it can be replaced by a new supply. Any desired pulley carrier 42 can be used for the band supply 44. Here, reference is made particularly to known band retaining devices for color bands or printed material available on pulleys in printers, for example, thermal printers. The pulley carrier 42 also contains devices for fixing the band supply 44 in the sideways direction.

Figure 3:
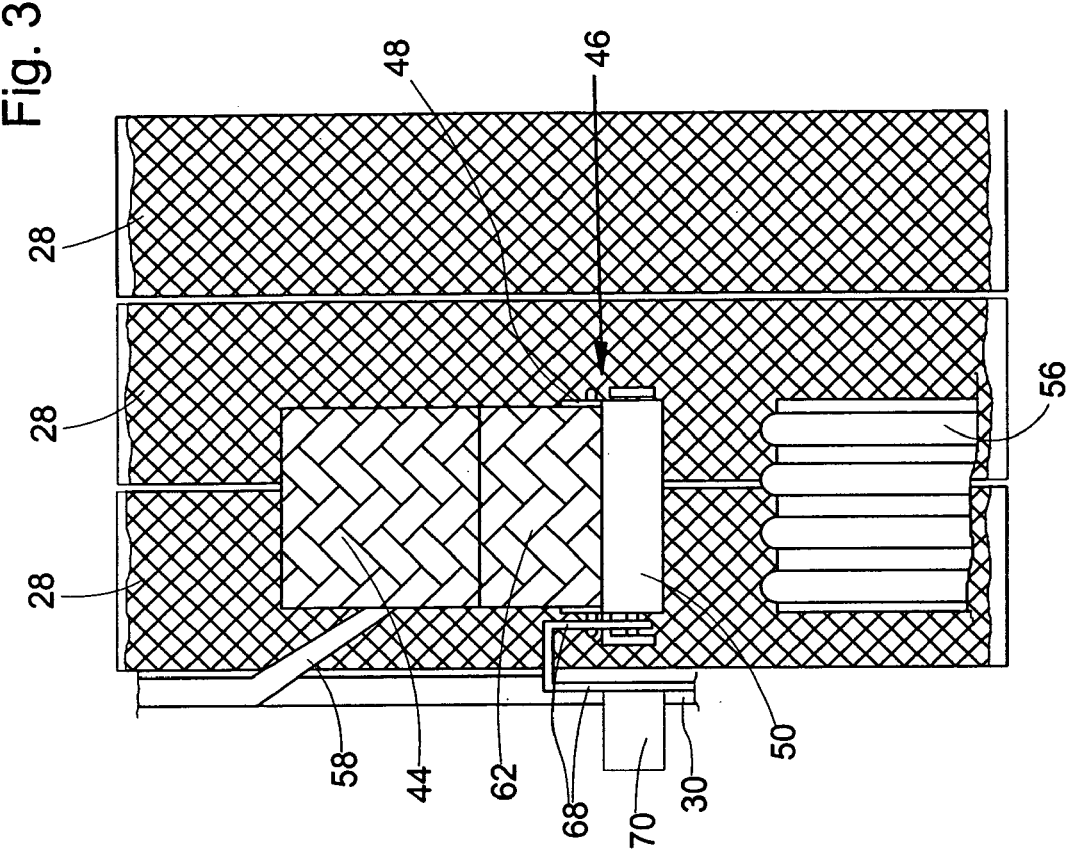
FIG. 3 is a rear view of the rear region of the rotobaler of FIG. 2.
Figure 4:
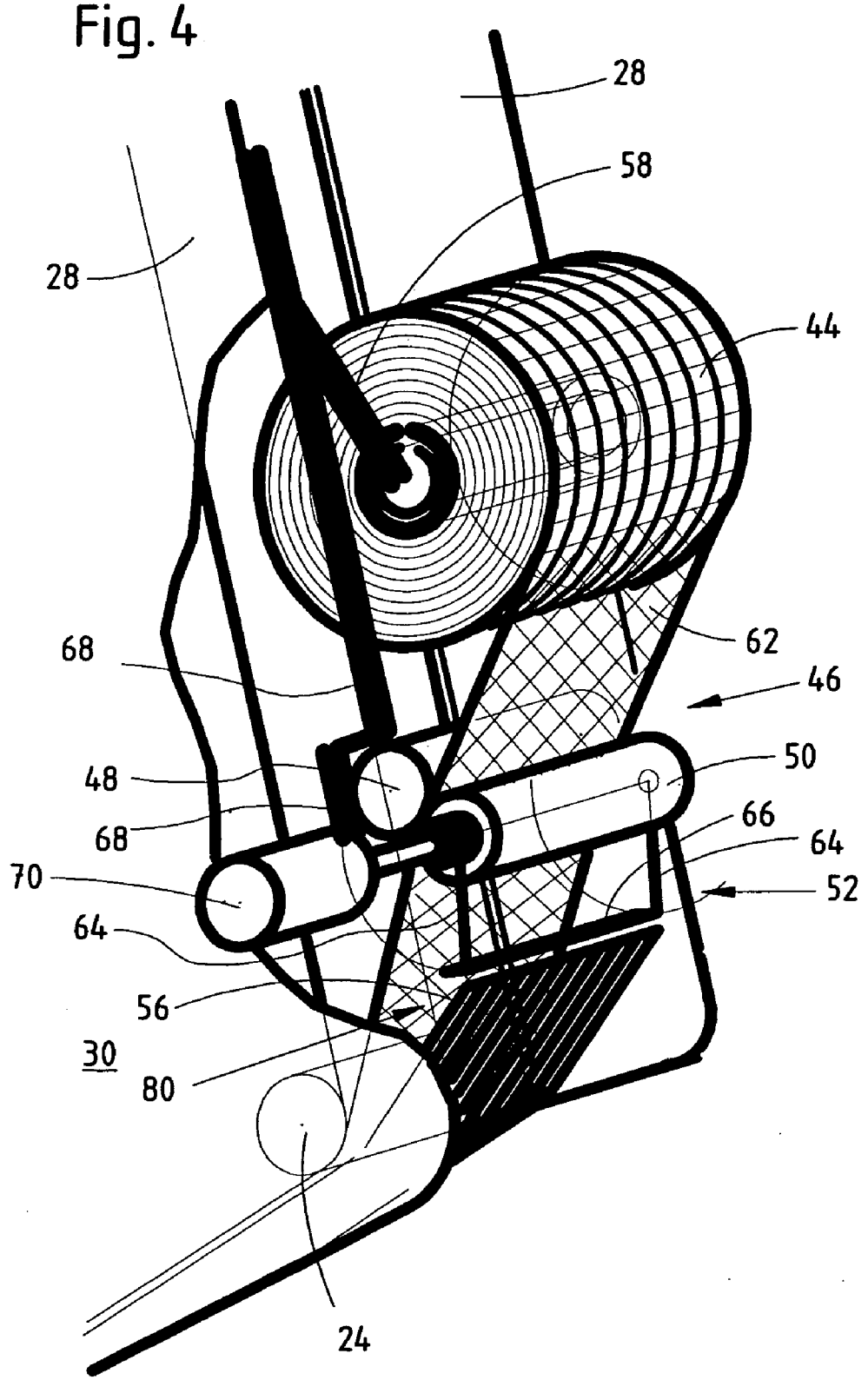
FIG. 4 is a perspective view of the assembly shown in FIGS. 2 and 3.

As can be seen in FIGS. 2 through 4, the band 62 that was unwrapped from the band supply 44 is conducted through a slot formed by the supply rolls 48, 50 of the advance assembly 44. The supply rolls 48, 50 are provided with axes extending parallel to each other and are preferably pressed against each other by spring force. They could also be arranged rigidly relative to each other. In both cases they can be equipped with inherently elastic material, at least on their outer sides, in order to attain a sufficiently secure guidance and conveying of the band 62. In place of the supply rolls 48, 50 any desired other advance assembly 46 may be selected, for example, by using a slot enclosed by conveying belts to accommodate the band or a roll and a stationary surface between which the band 62 is conducted. The advance assembly can also perform a linear movement in which it moves an end of the band that has been held fast in a straight line motion or in a curved track in the direction of the conveying elements 28.

The supply rolls 48 and 50 are supported in bearings, free to rotate, on a retaining assembly 68 that is connected to the side wall 30 and/or the rear wall 60. The retaining assembly 68 also includes a motor 70. In contrast to FIGS. 3 and 4, where it is shown for the sake of simplicity, the retaining assembly 68 can also retain the other ends of the supply rolls 48, 50.

The separating assembly 52 includes a molding 66 extending across the width of the band 62 that is supported in bearings, free to pivot, on legs 64 at the ends of the retaining assembly 68. The pivot axis of the separating assembly 52 extends coaxially to the axis of rotation of the supply roll 50. Several pins and/or prongs are attached to the molding 66 which extend from the molding 66 in the direction toward the band 62. In place of the pins or prongs, teeth could also be provided, with which it is possible to perforate the band 62 so that it tears when it is penetrated. The anvil 54 is located on the side of the band 62 opposite to the separating assembly 52 and downstream of the supply rolls 48, 50. If the separating assembly 52 is brought into the position shown in FIG. 2, then the band 62 lies between the molding 66 and the anvil 54.

Figure 5:
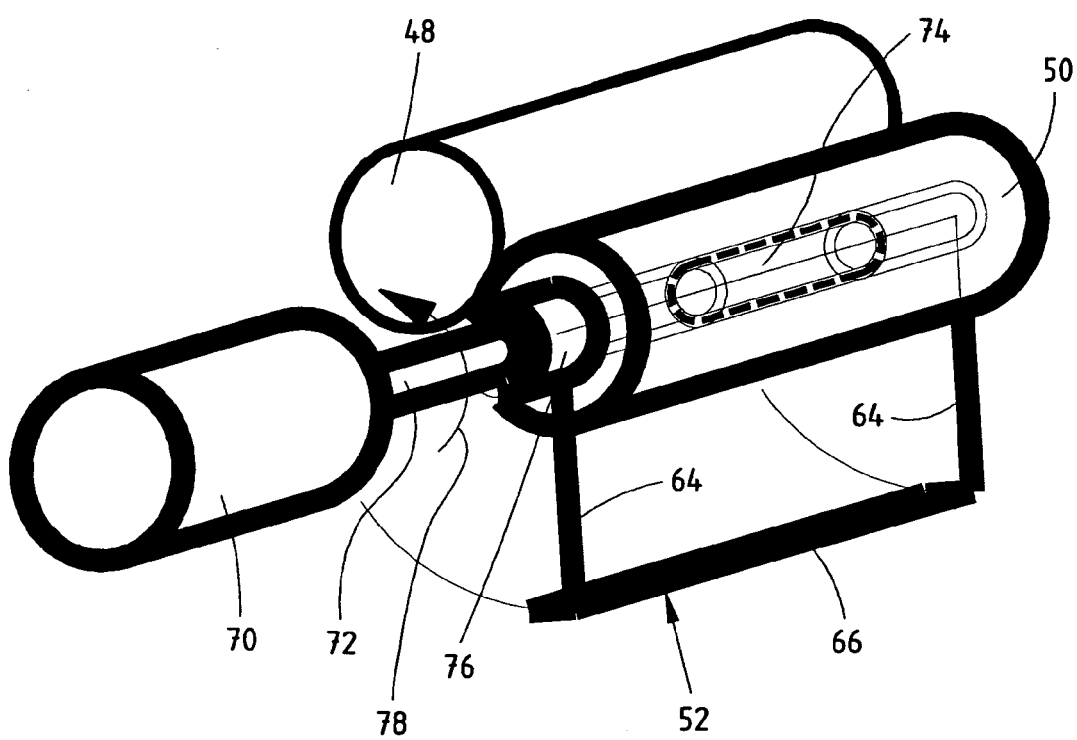
FIG. 5 is an enlarged view of the motor and the advance assembly.

The drive connection between the motor 70, the supply roll 50 and the separating assembly 52 is shown schematically in FIG. 5. A shaft 72 of the motor 70 is connected with the supply roll 50 over a first overrunning clutch 74. Moreover the shaft 72 is connected to the separating assembly 52 over a second overrunning clutch 76. The supply roll 48 is not driven directly and can rotate freely.

The first overrunning clutch 74 is configured in such a way that it transmits a torque provided by the driven motor 70 to the supply roll 50 only when the first shaft 72 rotates in a first direction that corresponds with the arrow 78 in FIG. 5, that is, in the counterclockwise direction, when the shaft 72 rotates in a first direction, and that the shaft 72 does not rotate any slower in the first direction than the supply roll 50. The second overrunning clutch 76 is configured in such a way that it transmits a torque provided by the driven motor 70 to the separating assembly 52 only when the shaft 72 rotates in a second direction that is opposite to the first direction.

Appropriate overrunning clutches 74, 76 are known, for example, from bicycles. Overrunning clutches 74, 76 can be used, for example, with rolls used as locking devices that are known from free wheeling hubs or with locking pawls that are also used on free wheeling hubs or with torsion bars that endeavor to hook onto the shaft 72 when it rotates in one direction and is released when the shaft 72 rotates in the opposite direction.

Accordingly the motor 70 is a motor that can be driven bi-directionally. This may be an electric motor, such as a direct current motor that can be reversed by interchanging the poles, or an alternating current motor whose stator and rotor poles can be interchanged in order to reverse the direction of rotation. The motor 70 may also be a hydraulic motor or a pneumatic motor. It would also be conceivable to drive the shaft 72 with the use of appropriate clutches and drive connections by other elements, particularly hydraulic elements or elements of the rotobaler 10 driven by a power take-off shaft of the agricultural tractor or by a clockwork or manually. The motor 70 is controlled by a control assembly 82.

The range of movement of the separating assembly 52 in the second direction, that is, in the clockwise direction as seen in FIG. 5, is limited by the anvil 54. In order to avoid any damage to the motor 70 when the separating assembly 52 makes contact with the anvil 54, a sensor, not shown, can detect the position of the separating assembly 52, either optically or mechanically and turn off the motor 70 by means of the control assembly 82 as soon as the separating assembly 52 touches the anvil 54. It would also be conceivable to measure the flow (of electric current, hydraulic fluid or pneumatic air) through the motor 70 and to turn it off automatically by means of the control assembly 82 when a certain threshold value is exceeded which is due to the contact of the separating assembly 52 against the anvil 54.

In another embodiment an overload clutch, for example, a friction clutch, is inserted into the driveline between the motor 70 and the separating assembly 52 and the motor 70 is driven for a predetermined time interval. Moreover it should be noted that the positions of the anvil 54 and the molding 66 could be interchanged, so that then the molding 66 would be stationary and the anvil 54 would be moved by the second overrunning clutch 76. The range of movement of the separating assembly 52 away from the anvil 54 is limited by a stop 84.

The guide assembly 56 extends from a forward end, that is located underneath the conveying element 28 and the roll 26, to the rear and upward to a location just underneath the roll 24 and from there inclined upward and to the rear. As can be seen on the basis of FIGS. 1 through 4 the band 62, that was unwrapped from the band supply 44, is conducted between the supply rolls 48, 50 and between the anvil 54 and the molding 66 of the separating assembly 52 and finally reaches the intervening space 80 between the conveying element 28 and the guide assembly 56. The surface of the guide assembly 56 facing the band 62 is equipped with a relatively low friction coefficient.

On the basis of the above description the result is the following method of operation, where the initial assumption is that the band 62 has been inserted in the above described way and ends between the anvil 54 and the separating assembly 52, as shown in FIG. 2, while the separating assembly 52 is in the position shown in FIG. 4.

After a completed wrapping process by the yarn wrapping assembly 38 one or more loose yarn ends are lying on the left end region of the cylindrical bale, in particular in alignment with the band 62. The control assembly 82 receives a signal pointing to this fact and induces the motor 70 to rotate the shaft 72 in the first direction shown in FIG. 5 by the arrow 78. The supply roll 50 is driven by the first overrunning clutch 74 and rotates in the counterclockwise direction relative to FIGS. 2, 4 and 5. On the basis of the selected first direction of rotation there is no transmission of torque from the shaft 72 over the second overrunning clutch 76 to the separating assembly 52.

Therefore the band 62 is conveyed successively into the intervening space 80 and then reaches the slot between the region of the conveying element 28 between the rolls 24, 26 and the guide assembly 56. On the basis of a high degree of friction between the band 62 and the conveying element 28 on the one hand and a low degree of friction between the band 62 and the guide assembly 56 on the other hand, the band 62 is carried along and conveyed up to the inlet 34, where it circulates around the roll 26 and reaches the slot between the cylindrical bale and the conveying element 28. The cylindrical bale carries the band 62 further along and wraps it around its circumferential surface in the area of the loose yarn ends. As soon as the conveying element and/or the cylindrical bale has grasped the band 62 and carries it along, the supply roll 50 rotates faster than the shaft 72. The supply roll is now driven by the band 62, this has the result that the first overrunning clutch 74 automatically separates the drive connection between the shaft 72 and the supply roll 50. Accordingly there is no danger that the band 62 could tear off. The motor 70 can be driven further or it can be turned off automatically if the control assembly is supplied with information that the cylindrical bale has carried the band 62 along, that could be determined, for example, by rotational speed sensors on one or both of the supply rolls 48 or 50 and on the basis of the known or measured rotational speed of the motor 70 or on the basis of the power consumption of the motor 70.

After more than one revolution of the cylindrical bale the second layer of the band 62 lies upon the first layer and adheres on the basis of the adhesion and/or the net form of the band 62 and/or the adhesive, so that the loose yarn ends are secured.

As soon as a secure adhesion of the layers of the band 62 to each other is assured, which can be detected after an elapsed time by a rotational speed sensor on the band supply 44 or on a supply roll 48, 50 or in any other desired way, the control assembly 82 induces the motor to rotate the shaft 72 in the second direction, that is, opposite to the direction of the arrow 78 in FIG. 5. Now the second overrunning clutch 76 engages the drive connection to the separating assembly 52 and the molding 66 is forced against the anvil 54, whereby the pins, teeth, prongs or the like penetrate into the band 62. As soon as the band 62 has been penetrated by the projecting elements of the molding 66, the span of the band 62 located downstream of the separating assembly 52 that is under tension, tears off, while the part connected to the band supply 44 is retained on the molding 66. Since the pulley carrier 42 does not continue to rotate or hardly does so on the basis of the brake, it and the band supply 44 come to an immediate stop. The motor 70 is brought to a stop by the control assembly 82 in the manner described above.

Immediately following, the shaft 72 is again rotated in the first direction by the control assembly 82 for a relatively brief time interval in order to reduce the load on the separating assembly 52, that is, in order to release the drive connection between the shaft 72 and the separating assembly 52, which is still provided by the second overrunning clutch 76. Then the separating assembly 52 reaches the position according to FIGS. 4 and 5 from the position shown in FIG. 2 under the force of gravity. This avoids conveying problems of the band 62 during the next wrapping process. But it would also be possible to utilize the towing force of the cylindrical bale or of the conveying element 28 with which the band 62 can rotate the separating assembly 52 from the position shown in FIG. 2 into the position according to FIGS. 4 and 5. It would also be conceivable to pivot the separating assembly 52 under the force of the band 62 as conveyed to this point by the supply rolls 48, 50 downward at least so far that the band 62 can pass through between the anvil 54 and the separating assembly 52. In this case the separating assembly 52 could remain in the position shown in FIG. 2 after cutting the band 62.

Thereby the motor 70 is used for the active conveying of the band 62 to the rotobaler and for the automatic cutting of the band 62 from the band supply 44.

In accordance with the provisions of the patent statutes, the present invention has been described in what is considered to represent its preferred embodiment. However, it should be noted that the invention can be practiced otherwise than as specifically illustrated and described. It is therefore intended that the foregoing detailed description be regarded as illustrative rather than limiting, and that it be understood that it is the following claims, including all equivalents, that are intended to define the spirit and scope of this invention.

What is claimed is:

1. An assembly for securing a loose yarn end on a cylindrical bale contained in a baling chamber of a large round baler comprising:

a carrier for a pulley shaped band supply being mounted on said baler exteriorly of said baling chamber;

a flexible, adhesive band supply being mounted on said carrier for rotation about a first horizontal axis;

an advance assembly including first and second feed rolls mounted on said baler adjacent said carrier for rotation about respective horizontal axes which are parallel to said first horizontal axis, with said first roll having a circumference engaged with a circumference of said second feed roll;

a band of said band supply being inserted between said first and second feed rolls and adapted for being conveyed along a path to said baling chamber by counter-rotating said first and second rolls of said advance assembly, such that in the baling chamber the band can be wrapped around a cylindrical bale in the region of the loose yarn end;

a bi-directional motor being coupled to said first roll of said advance assembly by a drive connection including an overrunning clutch, the overrunning clutch establishing a drive connection between the motor and said first roll of the advance assembly only when said motor is being driven in a first direction causing said first roll to be driven in a first motion transmission direction so as to convey the band in the direction of the baling chamber.

2. The assembly according to claim 1, and further including a separating assembly for selectively separating a band, extending along said path and being wrapped about a given bale in said baling chamber, from said band supply, with said separating assembly including an anvil and a molding carrying band penetrating elements, with one of said anvil and molding being mounted for pivoting about the axis of rotation of said first roll for movement between an inactive position, wherein said anvil and molding spaced from each other on opposite sides of said path, and an active position, wherein said anvil and band penetrating elements are engaged against each other in gripping relationship to said band; said motor being connected with said one of said anvil and molding of said a separating assembly by a drive connection including a second overrunning clutch which establishes a drive connection between the motor and the separating assembly only when said motor is driven in a second direction opposite to said first direction to cause said one of said anvil and molding to be driven from said inactive position in a second motion transmission direction into said active position.

3. The assembly according to claim 2, and further including a mechanical stop mounted so as to stop said one of said anvil and molding of the separating assembly at said inactive position when moving from said active position.

4. The assembly according to claim 3, further comprising a control assembly coupled to said motor for sending control signals for selectively starting or stopping said motor and for selectively effecting said first and second directions of rotation in response to appropriate input signals; a sensor connected to said control assembly and being positioned for detecting the position of said one of said anvil and molding of the separating assembly and for sending a position input signal to said said control assembly of the motor.

5. The assembly according to claim 4, wherein the control assembly is configured to stop rotation of the motor in the second direction upon receiving said position input signal from the sensor.

6. The assembly according to claim 2, wherein said one of said anvil and molding of the separating assembly is configured to be brought from the active position into the inactive position by means of the band.

7. The assembly according to claim 2, wherein the separating assembly is configured to be brought from the active position into the inactive position by means of the force of gravity.

* * * * *